United States Patent [19]
Hashimoto et al.

[11] Patent Number: 5,315,904
[45] Date of Patent: May 31, 1994

[54] APPARATUS FOR CUTTING INNER CIRCUMFERENTIAL SURFACE OF THICK WALLED SMALL DIAMETER PIPE

[75] Inventors: Yasuaki Hashimoto, Tagata; Akio Nakane, Mishima; Tadahiro Uematsu, Numazu, all of Japan

[73] Assignee: Usui Kokusai Sangyo Kaisha Ltd., Japan

[21] Appl. No.: 985,187

[22] Filed: Nov. 30, 1992

[30] Foreign Application Priority Data

Dec. 4, 1991 [JP] Japan .................. 3-348126

[51] Int. Cl.⁵ .............................. B23B 5/08
[52] U.S. Cl. ........................... 82/129; 408/62; 408/69; 408/705
[58] Field of Search ............. 82/129, 131, 113, 124; 408/53, 62, 69, 705; 409/244, 257, 265–268, 269, 270, 275, 277, 280–285

[56] References Cited

U.S. PATENT DOCUMENTS

| | | | |
|---|---|---|---|
| 1,532,107 | 3/1925 | Ferris | 409/276 |
| 2,183,861 | 12/1939 | Cotter, Sr. | 72/275 |
| 2,315,476 | 3/1943 | Groene | 409/275 |
| 3,046,846 | 7/1962 | Bonnafe | 409/265 |
| 3,517,536 | 6/1970 | Fitzmaurice | 72/275 |
| 4,531,868 | 7/1985 | Gabriele | 409/244 |
| 4,573,841 | 3/1986 | Petkov et al. | 409/244 |

FOREIGN PATENT DOCUMENTS

| | | | |
|---|---|---|---|
| 123604 | 5/1988 | Japan | 409/282 |
| 111907 | 4/1992 | Japan | 72/70 |
| 772755 | 11/1980 | U.S.S.R. | 409/283 |
| 891261 | 12/1981 | U.S.S.R. | 409/283 |

Primary Examiner—William E. Terrell
Attorney, Agent, or Firm—Anthony J. Casella; Gerald E. Hespos

[57] ABSTRACT

A device for cutting the inner circumferential surface of a thick-walled small diameter pipe comprising a setting means for inserting a core bar having a cutting blade on one end thereof into a pipe to be processed, a rotating means for rotating said pipe to be processed set by the setting means about the axis thereof relative to said core bar, a feed means for cutting the inner surface of said pipe to be processed with said cutting blade while pulling the core bar which is securely held at the other end thereof relative to said pipe to be processed, and a control means for controlling each of said means, providing a smooth high quality inner surface having excellent proof pressure against internal pressure.

11 Claims, 8 Drawing Sheets

APPARATUS FOR CUTTING INNER CIRCUMFERENTIAL SURFACE OF THICK WALLED SMALL DIAMETER PIPE

BACKGROUND OF THE INVENTION

1. Field of the Invention

The present invention relates to a device for cutting the inner circumferential surface of a thick-walled small diameter pipe which must be smooth on its inner circumferential surface and more particularly to a device for cutting the inner circumferential surface of a thick-walled small diameter pipe which is used with facility for manufacturing thick-walled small diameter pipes by repeating a process comprising a pipe extension process and a heating process on a pipe to be processed plural times.

2. Description of the Prior Art

A thick-walled small diameter pipe used for a fuel injection pipe of a diesel engine must have a smooth inner surface to reduce the resistance inside the pipe and to prevent the clogging at the injection nozzle. In addition, it is required that defects especially microscopic cracks on the inner circumferential surface of the pipe are reduced in order for the pipe to be able to withstand repetitive fatigue under high pressures.

This type of thick-walled small diameter pipe is made through a cold drawing process comprising repetitive pipe extension processes and heating processes performed on a pipe to be processed (original carbon steel pipe). The pipe to be processed has a black skin layer including cracks and concave puckers thereon because it is a seamless pipe and made through a cold drawing process. In this case, even if a process for removing the black skin layer is performed on the pipe to be processed using chemical means such as an acidic liquid, it is difficult to completely remove the black skin layer to modify the inner circumferetial surface of the pipe to be processed into a uniform steel skin surface and the black skin layer often remains.

This can result in clogging of the nozzle due to a part of the black skin layer that peels off when such a pipe is used as a fuel injection pipe for a diesel engine.

The applicant has proposed in examined Japanese patent publication No. 51-21391 a method of manufacturing a thick-walled small diameter carbon steel pipe wherein, in forming a pipe to be processed into a thick-walled small diameter pipe, a black skin layer on the inner circumferential surface of the pipe to be processed is removed in advance (hereinafter referred to as initial internal machining) by a mechanical means (mechanical cutting or grinding) to modify the entire surface inside the pipe into a steel skin. The proposed method makes it possible to obtain a thick-walled small diameter carbon steel pipe having an inner circumferential surface which is highly smooth and excellent in circularity and uniformity and which has substantially no black skin layer on the inner surface thereof.

With the initial internal machining method according to the above-described proposal, it is possible to remove almost all the black skin layer, impurities, puckers and flaws that are left on an inner circumferential surface of a pipe to be processed which is manufactured through a hot rolling process. However, if the pipe to be processed is very uneven in thickness and is very eccentric, some of such defects may remain and, in addition, it is not possible to eliminate, during the manufacturing method for a thick-walled small diameter pipe, the defects which are newly introduced during a subsequent pipe extension process performed on the pipe to be processed.

In the manufacture of this type of thick-walled small diameter pipe, concave puckers are produced on the inner circumferential surface of a pipe to be processed during a pipe extension process conducted on the pipe to be processed after initial internal machining. The puckers then close and change to microscopic cracks. Even if the black skin layer is removed using the internal machining according to the above proposed method, cracks of sizes up to 8 μm may be produced. If the above-described initial machining is not carried out, cracks of sizes up to 300 μm may be produced. Further, pipes to be processed are frequently uneven in thickness and eccentric because they are manufactured through a hot rolling process. Such pipes to be processed have been cut in a manner such as represented by gun drill process which is one of the methods of deep hole processing wherein a cutting tool is pushed into a pipe to be processed fixed on a jig while it is being rotated. (This process uses a tool referred to as gun drill which is aimed at obtaining the linearity of a hole, and this technique has been used in order to prevent the hole processed from becoming eccentric and curving.) Since the cutting is carried out while pushing the tool, great cutting resistance is exerted on the tool and the process can not be continued due to the deflection of an arbor caused by the pushing force unless the thickness of the arbor is increased. When a thick arbor is used to improve rigidity, the tool may advance straight without copying the inner circumferential surface of a pipe to be processed which is eccentric due to uneven thickness. In this case, a black skin layer may remain uncut even if a tool thicker than the inner diameter is used.

SUMMARY OF THE INVENTION

The present invention has been conceived considering the above-described situation regarding this type of device for cutting the inner circumferential surface of a thick-walled small diameter pipe. It is an object of the present invention to provide a device for cutting the inner circumferential surface of a thick-walled small diameter pipe whereby a black skin layer produced during hot rolling is completely eliminated even for a pipe to be processed which is uneven in thickness and is eccentric; even if microscopic cracks are newly produced during a pipe extension process after initial internal machining, they are reliably removed; high proof pressure against repetitive internal pressure is obtained; and a small diameter pipe of high quality is thus obtained.

In order to achieve the above-described object, the device for cutting the inner circumferential surface of a thick-walled small diameter pipe according to the present invention comprises a setting means for inserting into a pipe to be processed a core bar having a cutting blade on one end thereof, a rotating means for rotating said pipe to be processed set by the setting means about the axis thereof relative to said core bar, a feed means for cutting the inner surface of said pipe to be processed with said cutting blade while pulling the core bar secured and held at the other end relative to said pipe to be processed, and a control means for controlling each of said means.

In the device for cutting the inner circumferential surface of a thick-walled small diameter pipe according to the present invention, a pipe to be processed is mounted onto a small diameter core bar having a cutting blade on one end thereof by the setting means prior to a diameter-reducing pipe extention process near the final process stage. Next, the pipe to be processed set by the setting means is rotated about the axis thereof relative to the core bar.

Further, the core bar which is chucked on the other end thereof is pulled relative to the pipe to be processed. As a result, even if the pipe to be processed is uneven in thickness and is eccentric, the cutting blade cuts the pipe copying the inner circumferential surface thereof. In addition, even if microscopic cracks, concave puckers and the like are newly produced in a pipe extension process prior to said cutting process, such defects can be eliminated. In this case, since the pipe diameter has become small when it has come close to the final pipe extension process stage and the pipe is being processed through a pulling process, no large cutting resistance is applied to the core bar and only cutting torque and thrust force produced by the pulling are exerted. Therefore, it is possible to use a core bar having a small diameter which is less rigid relative to the pipe to be processed and which has a good copying property, and the cutting process is performed under a tensile load. This allows the cutting blade of the small diameter core bar to perform a cutting process by copying the inner circumferential surface even if the pipe to be processed is uneven in thickness and is eccentric, thereby removing the black skin layer completely.

Further, if a pipe to be processed is not rotated and a core bar is rotated during the cutting process, a long core bar undergoes self-excited vibration increasing the roughness of the surface processed. However, by rotating the pipe to be processed instead of rotating the core bar, it is possible to prevent the self-excited vibration of the core bar, stabilizing the processing and reducing the roughness of the surface processed.

Pipe extension and heating processes are performed on the pipe to be processed which has been cut on the inner circumferential surface thereof as described above, and there is produced a thick-walled small diameter pipe having an inner circumferential surface of high quality.

DETAILED DESCRIPTION OF PREFERRED EMBODIMENTS

Figure 1:
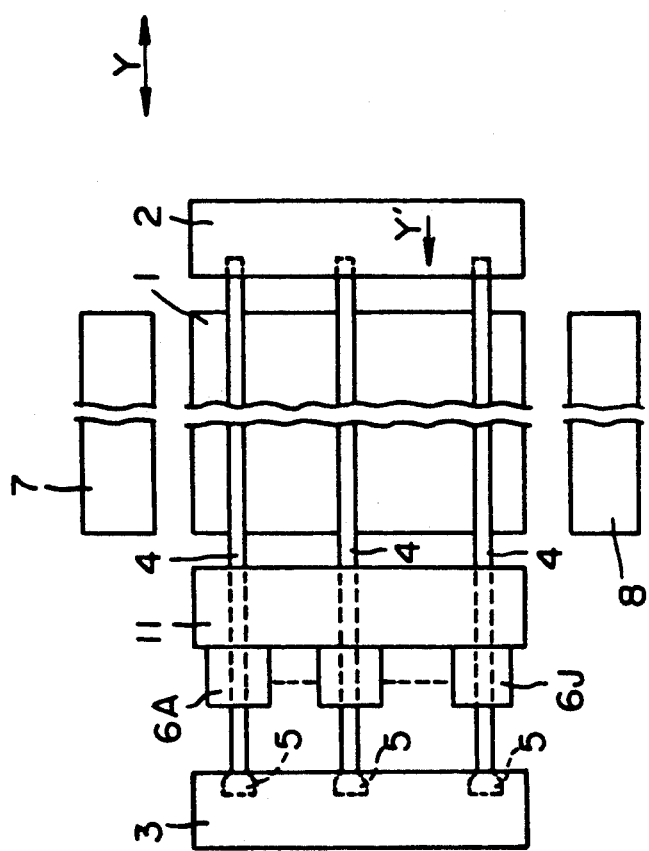
FIG. 1 illustrates a first process stage of a cutting process which is a major part of an embodiment of a device for cutting the inner circumferential surface of a thick-walled small diameter pipe according to the present invention.
Figure 2:
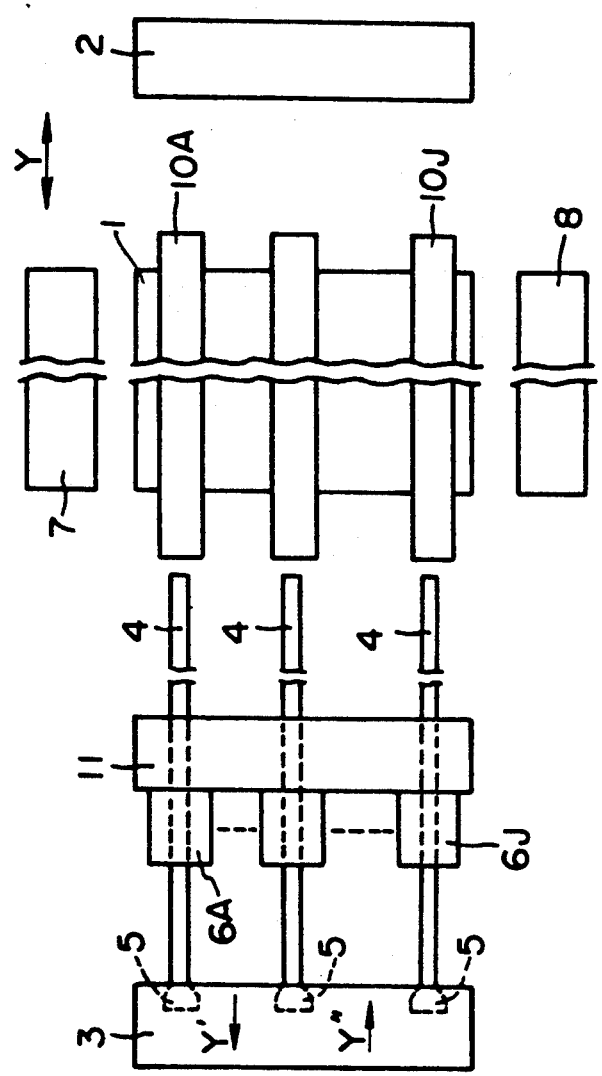
FIG. 2 illustrates a second process stage.

In the first embodiment of the device for cutting the inner circumferential surface of a thick-walled small diameter pipe according to the present invention shown in FIGS. 1–4, a holding and moving element 2 and a core bar holding element 3 are mounted to be movable on a base (not shown) in the transport direction indicated by the arrow Y in the figures so that they sandwich a stationary pipe holding table 1 for holding a pipe to be processed. Each of the core bars 4 held by the holding and moving element 2 and core bar holding element 3 has a cutting blade 5 provided on one end thereof.

The core bar holding element 3 is configured so that it can move the core bars 4 in the axial direction (Y direction) of the core bars 4 while holding and securing the core bars 4 at the ends thereof at which the cutting blades 5 are formed. The holding and moving element 2 is configured so that it can move the core bars 4 in the axial direction (Y direction) of the core bars 4 while holding and securing the core bars 4 at the other ends thereof. The holding and moving element 2 and core bar holding element 3 are adapted to be able to hold a plurality of (e.g., 10) core bars at a time.

A pipe chuck 11 for engaging and chucking pipes 10A–10J is disposed so that it faces the core bar holding element 3. The pipe chuck 11 has rotating devices 6A–6J provided thereon and is configured so that it rotates the pipes about their axes.

A pipe supplier 7 is provided at one side of the pipe holding table 1 and a product receiving table 8 is provided at the other side thereof. The the pipe holding table 1, holding and moving element 2, core bar holding element 3, pipe supplier 7, product receiving table 8 and pipe chuck 11 to which the rotating devices 6A–6J are connected are configured so that they will operate in accordance with control signals from a control circuit (not shown).

A process which performes a pipe extension process and a heating process on pipes to be processed is repeated plural times to manufacture a thick-walled small diameter pipe. In the first embodiment, this process is repeated four times and, at-the third process stage, the pipe to be processed is feed to the device for cutting the inner circumferential surface of a thick-walled small diameter pipes as shown in FIGS. 1-4 to perform a cutting process on the inner circumferential surface.

Next, the operation of the first embodiment will be described with reference to the flow chart in FIG. 6. In this embodiment, various pre-processes are performed prior to the cutting process on the inner circumferential surface of the pipes to be processed. First, such pre-processes will be described.

In the first embodiment, a carbon steel pipe of JIS G 3455 STS 370 having an outer diameter of 34 mm and a thickness of 4.5 mm which is a hot-drawn material was used as a pipe to be processed. First, pickling was performed at a temperature of 60 degrees C for 30 to 60 minutes in a 20 percent sulfuric acid solution to remove scales on the inner and outer surfaces and, thereafter, water washing and neutralizing process using a caustic soda aqueous solution was performed.

Next, the pipe to be processed was dipped in a bonderizing liquid (manufactured by Nippon Parkerizing K.K.) to form phospheric zinc films on the inner and outer surfaces thereof.

Subsequently, the pipe to be processed was swaged to allow the end thereof to be inserted into a drawing die and dipped in lubricating oil. A first pipe extension process was performed to reduce the outer diameter and thickness to 27 mm and 3.7 mm, respectively, using a plug and a die and, thereafter annealing was performed by heating at 800 degrees C for 10 minutes using bright DX gas. A second pipe extension process along with an annealing process was then performed to reduce the outer diameter and thickness to 21 mm and 3.6 mm, respectively, and, a third pipe extension process along with an annealing process was further performed to reduce the outer diameter and thickness to 15 mm and 3.0 mm, respectively. Further, a fourth pipe extension process was performed to reduce the outer diameter and thickness to 9.5 mm and 2.55 mm, respectively and, thereafter, a leveling process, cutting to a regular size and a chamfering process on one end were performed.

Figure 6:
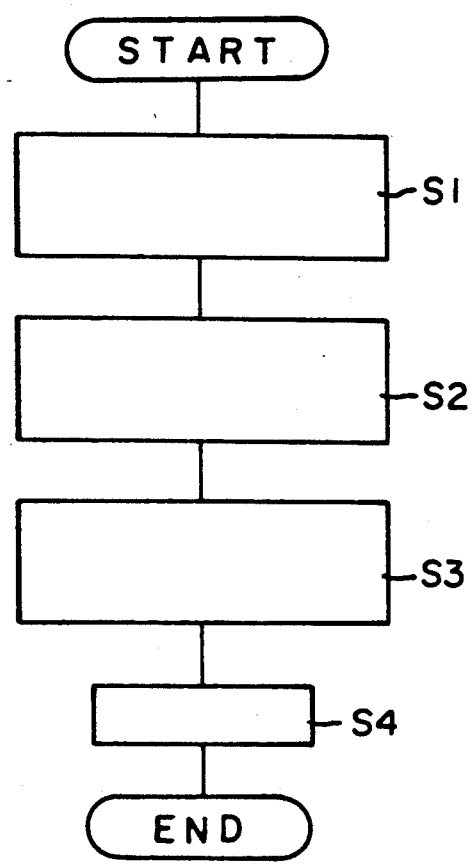
FIG. 6 is a flow chart illustrating the operation of an embodiment of the present invention.

When these pre-processes are complete, the process proceeds to step S1 in FIG. 6 wherein the cutting process in the first embodiment of the device for cutting the inner circumferential surface of a thick-walled small diameter pipe according to the present invention is performed. First, at step 1, the holding and moving element 2 which holds and secures the core bars 4 at the ends thereof opposite to the cutting blades 5 moves in a direction Y' toward the pipe holding table 1, and the side of the core bars 4 at which the cutting blades 5 are located penetrates through the pipe chuck 11 and is held and secured to the core bar holding element 3 (Refer to FIG. 1.).

Next, the core bar holding element 3 which holds and secures the side of the core bars 4 at which the cutting blades 5 are located, and the pipe chuck having the rotating devices 6A-6J connected thereto move in the direction Y' away from the pipe holding table 1. Then, pipes to be processed 10A-10J having an outer diameter 9.5 mm and a thickness of 2.55 mm on which said pre-processes have been completed, are supplied from the pipe supplier 7 to the pipe holding table 1, and a chamfered end of each pipe is disposed in a position facing the end of a core bar 4 held and secured to the core bar holding element 3 (Refer to FIG. 2). At step S2, the core bar holding element 3, pipe chuck 11, and rotating devices 6A-6J move in a direction Y" toward the pipe holding table 1 and, as a result, the core bars 4 are inserted into the pipes to be processed 10A-10J; at the same time, the pipe chuck 11 along with the rotating devices 6A-6J externally fits the pipes to be processed 10A-10J producing a state wherein the pipes to be processed 10A-10J are inserted through the pipe chuck 11; the parts of the cutting blades 5 held by the core bar holding element 3 project from the ends of the respective pipes to be processed 10A-10J; and the core bars 4 penetrates through the respective pipes to be processed 10A-10J projecting the opposite ends at the side of the holding and moving element 2.

Figure 3:
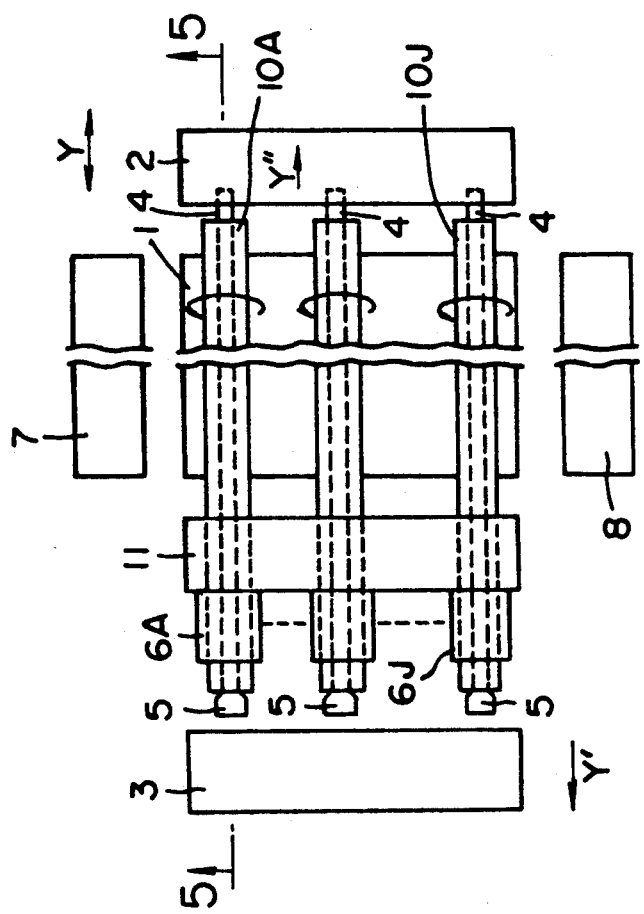
FIG. 3 illustrates a third process stage.
Figure 4:
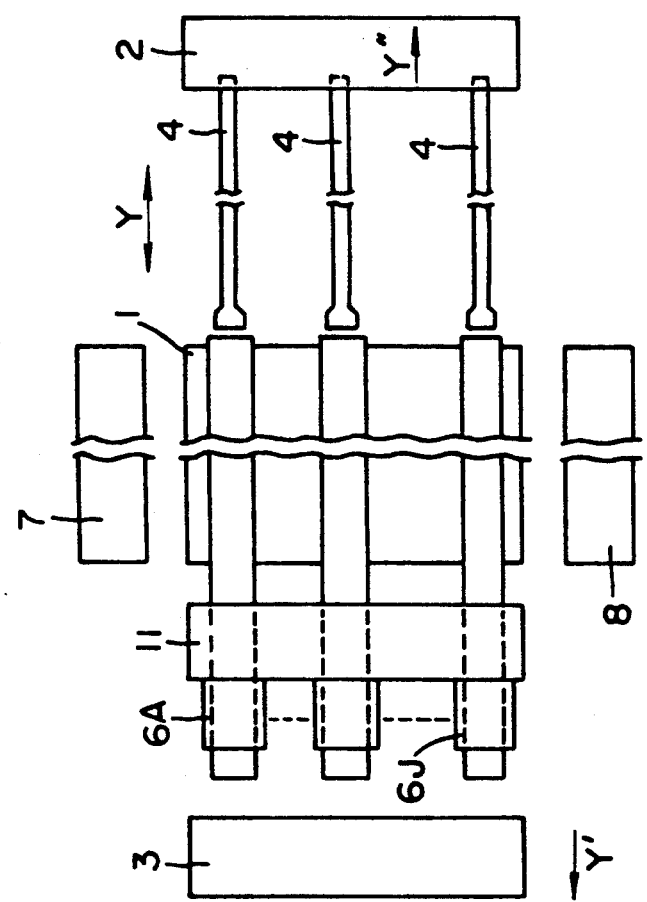
FIG. 4 illustrates a fourth process stage.
Figure 5:
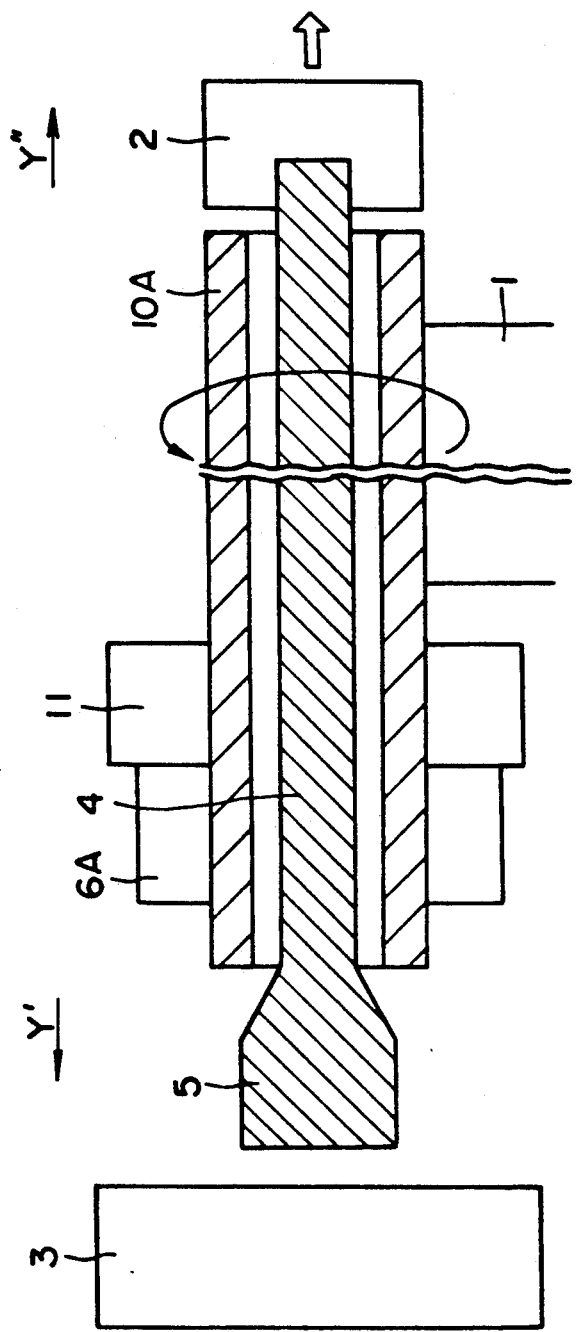
FIG. 5 is a sectional view taken along the line A—A in FIG. 3.

Next, the holding and moving element 2 moves in a direction Y'; the ends of the core bars 4 projecting from the opposite ends of the pipes to be processed 10A-10J are held and secured by the holding and moving element 2; the side of the core bars 4 at which the cutting blades 5 are located is released from the state wherein it is held and secured by the core bar holding element 3; and the core bar holding element 3 slightly moves in Y' direction resulting in a state wherein cutting process on the inner circumferential surface is started (Refer to FIG. 3 and FIG. 5.). Then, the pipes to be processed 10A-10J are chucked by the pipe chuck 11 and the rotating devices 6A-6J are driven to rotate, causing the pipes to be processed to be rotated as indicated by the arrow about their axes at a rotational speed of about 3000 to 4000 rpm.

Then, at step 4, the holding and moving element 2 moves in the direction Y- (See FIG. 4) away from the pipe holding table 1 at a speed of about 100 to 300 mm/min. Thus, the cutting blades 5 which are not rotating move in Y'' direction while copying the inner circumferential surfaces of the pipes to be processed 10A-10J which are being rotated to perform a cutting process on the inner circumferential surfaces of the pipes to be processed 10A-10J with cutting oil supplied. At this time, the cutting process is carried out while supplying cutting oil to the portion of the cutting blades 5 via the ends of the pipes and the like so that the edges of the cutting blades 5 are lubricated and cooled and chips are ejected. When the cutting blades 5 on the core bars 4 come out from the pipes to be processed, the cutting operation terminates; the rotation of the pipes to be processed is stopped; the pipe chuck 11, along with the core bar holding element 3, moves in Y' direction until it comes off the ends of the pipes to be processed; and the pipes to be processed 10A-10J are transferred to the product receiving table 8.

Post-processes as described below are performed on the pipes to be processed 10A-10J which have been performed.

After the chips are ejected and the cutting oil is removed, the pipes are annealed and dipped into lubricating oil and the fifth, final process stage of the present embodiment is started.

At the fifth process stage, the final pipe extension process is performed to reduce the outer diameter and thickness to 6.4 mm and 2.0 mm, respectively; dimensional inspection is performed after leveling; and cutting to regular size, chamfering, cleaning with triethane, and annealing a carried out to complete the entire process.

Thus, in the present embodiment, the cutting process is performed by copying the inner circumferential surfaces of the pipes to be processed 10A-10J after the fourth process stage in the total five process stages. As a result, even if there is unevenness of thickness or eccentricity, the black skin layer produced in hot rolling is completely removed and concave puckers produced during previous pipe extension process and microscopic cracks of sizes upto 80 μm resulting from the puckers are eliminated. Thus, the black skin layer on the inner circumferential surface has been completely eliminated; the surface has substantially no microscopic crack and is highly smooth, and a high quality thick-walled small diameter pipe having excellent circularity and uniformity has been obtained.

Next, another example will be described as another embodiment wherein pipes to be processed undergo total five times of repetitive pipe extension and heating processes and a cutting process on the inner circumferential surfaces is performed prior to the fourth process stage using the devices idential to those in the first embodiment.

In this embodiment, the process conditions up to the third process stage were all identical to those in the first embodiment except that a pipe extension process for reducing the thickness to 3.45 mm was performed at the third process stage.

A cutting process was performed on the inner circumferential surfaces prior to the fourth pipe extension process, the conditions for this process were identical to those in the first embodiment except that the rotational speed of the pipes to be processed was about 2000 to 3000 rpm.

The chips inside the resultant pipes to be processed were removed and, after cleaning with triethane and annealing, the fourth pipe extension process was performed to reduce the outer diameter and thickness to 9.5 mm and 2.75 mm, respectively. Then, swaging and annealing were performed and, after leveling and chamfering, the pipes were transferred to the fifth, final process stage.

At the fifth process stage, the final pipe extension process was performed to reduce the outer diameter and thickness to 6.4 mm and 2.2 mm, respectively. The subsequent processes were indentical to those in the first embodiment.

Figure 7:
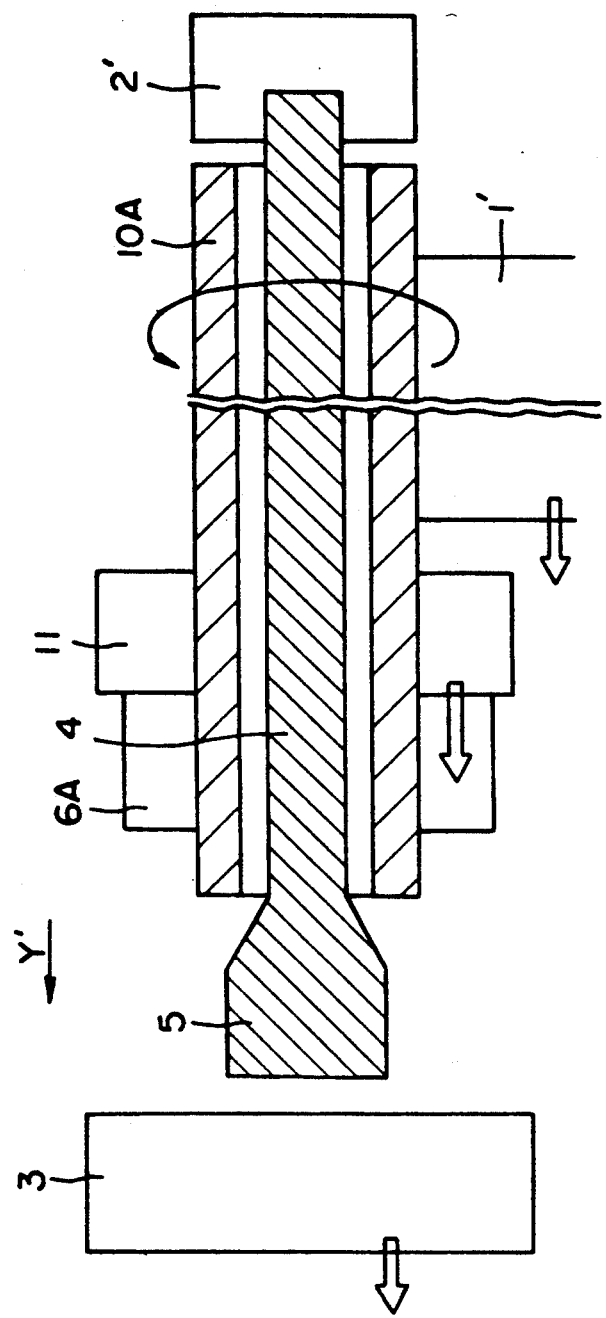
FIG. 7 is a diagram corresponding to FIG. 5 for a second embodiment.

On the inner circumferential surface of a resultant thick-walled small diameter pipe, the black skin layer produced during hot rolling has been completely eliminated by the cutting process copying the inner circumferential surface; concave puckers produced during the pipe extension process has been eliminated and the state of microscopic cracks of sizes upto 80 $\mu$m resulting from the puckers has been substantially improved to a maximum size of 30 $\mu$m, Although the above-described embodiment is illustrative of an example wherein pipes to be processed are rotated with the core bars kept moving, description will now be made with reference to FIG. 7 on a second embodiment wherein pipes to be processed are moved while being rotated and the core bars are fixed instead of being rotated.

The configuration and layout shown in FIG. 7 are substantially similar to those in the first embodiment except that the holding and moving element 2 is replaced with a stationary holding element 2' which is stationary in a predetermined position, and the pipe holding table 1 is replaced with a pipe moving and holding table 1' which is capable of moving while holding the pipes to be processed 10A–10J.

The operation of the second embodiment will now be briefly described. The present embodiment has a configuration wherein the cutting blades 5 on the core bars 4 which are held and secured by the stationary holding element 2' at the projecting ends thereof and which are inserted in the pipes to be processed 10A–10J, perform cutting by moving in Y' direction so that they copy the inner circumferential surfaces of the pipes to be processed. In order not to hinder the cutting process, the core bar holding element 3 is moved in Y' direction together with the pipe holding table 1' and pipe chuck 11.

Figure 8:
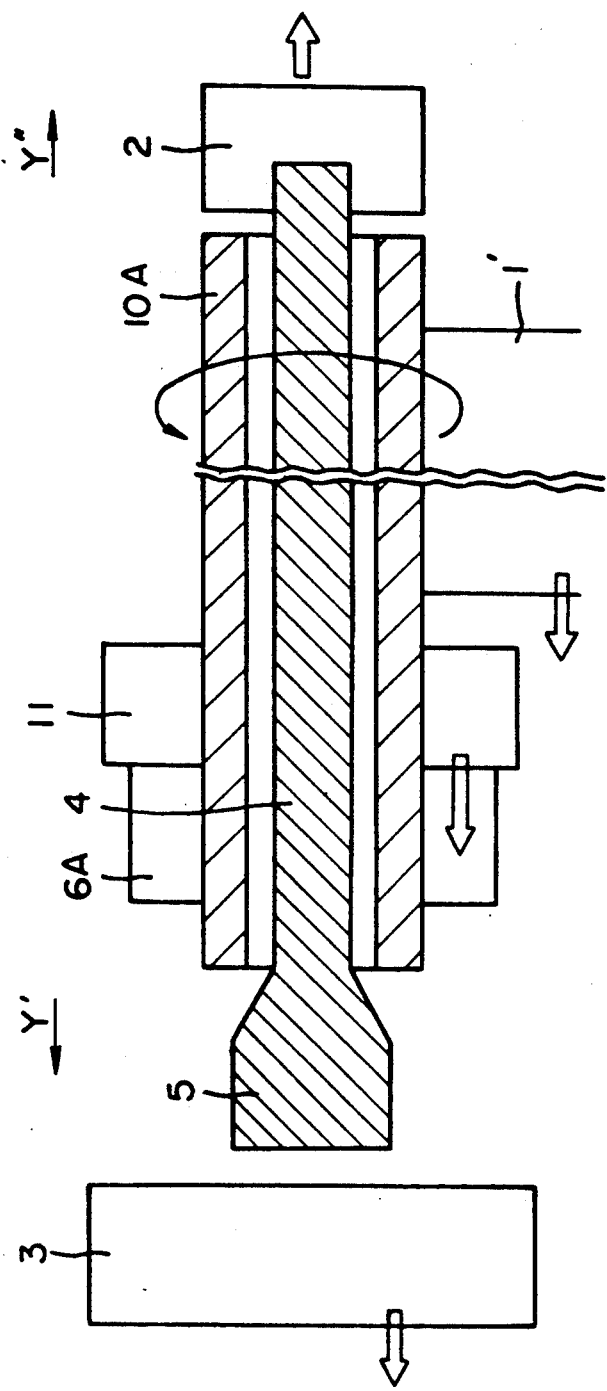
FIG. 8 is a diagram corresponding to FIG. 5 for a third embodiment.

Next, FIG. 8 shows a third embodiment of the present invention which has configuration and layout substantially similar to those in the first embodiment except that the pipe holding table 1 on which the pipes to be processed are placed, is replaced with a movable pipe moving and holding table 1' just as in the second embodiment and that the holding element for holding and securing one end of each core bar 4 is the moving and holding element 2 as in the first embodiment.

In this embodiment, the pipes to be processed 10A–10J are moved in Y' direction while being rotated, and the moving and holding element 2 holding and securing one end of each core bar 4 is moved in Y" direction which is opposite to Y' direction. As a result, the cutting process by copying the inner circumferential surfaces with the cutting blades 5 can be efficiently performed in a short period of time.

If the pipes to be processed are short, the core bars may be rotated with the pipes to be processed kept stationary.

Although the pipes to processed in the above-described embodiments are conventional pipes on which the initial internal machining is not provided, if cutting process is performed on a pipe which has been processed by means of this initial machining using the device for cutting the inner circumferential surface of a thick-walled small diameter pipe, the cutting speed will be increased with reduced cutting cost and it will be possible to more effectively remove microscopic cracks and the black skin layer produced during hot rolling Although the above-described embodiments are illustrative of the manufacture of a thick-walled small diameter pipe having an outer diameter of 6.4 mm and a thickness of 2.0 to 2.2 mm used as a fuel injection pipe for a diesel engine of an automobile, thick-walled small diameter pipe of other sizes may be manufactured such as one having an outer diameter of 6 to 15 mm and a thickness of 1.8 to 5.5 mm to be used for a diesel engine for a construction machine, vessel, or the like.

The above-described embodiments provide a high quality thick-walled small diameter pipe wherein microscopic cracks have been reduced at least to a maximum size of about 30 um; notch sensitivity has become low relative to the internal pressure; and proof pressure against repetitive internal pressure has been increased up to 1500 Kgf/cm$^2$.

As described above in detail, the device for cutting the inner circumferential surface of a thin-walled small diameter pipe according to the present invention performs a a cutting process is performed by copying the inner circumferential surface of a pipe to be processed prior to the pipe extension process near the final stage of the process comprising repeated extension and heating processes performed on a pipe to be processed. Therefore, it is possible to obtain a thick-walled small diameter pipe wherein a black skin layer produced during hot rolling is completely eliminated even for a pipe to be processed which is uneven in thickness and is eccentric; microscopic cracks on the inner circumferential surface are reduced; the smoothness of the inner circumferential surface is improved; circularity and uniformity are excellent; a high level of pressure withstanding property and high quality are achieved; and proof pressure against internal pressure is especially improved.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A device for cutting at least one thick-walled small diameter pipe having a longitudinal axis and an inner circumferential surface approximately concentric with the longitudinal axis, said device being operative to uniformaly cut away potions of the inner circumferential surface of said pipe despite any eccentricity of the inner circumferential surface relative to the longitudinal axis for removing defects and achieving smoothness in said pipe, said device comprising at least one core bar having opposed first and second ends, a cutting blade on said first end thereof, said core bar being dimensioned to fit in the pipe and being less rigid than the pipe, setting means for selectively holding the first end of the core bar and for inserting the second end of the core bar into the pipe to be processd, a rotating means for rotating said pipe about the axis thereof and relative to said core bar, a feed means for selectively holding the second end of the core bar and for generating relative movement between the core bar and the pipe such that the cutting blade of the core bar follows the inner circumferential surface through the pipe for uniformly cutting away the inner surface of said pipe to be processed with said cutting blade, and a control means for controlling each of said means, including releasing the setting means from the first end of the core bar after the holding of the second end of the core bar by the feed means.

2. A device according to claim 1, comprising a plurality of said elongate core bars, and wherein said setting means is operative for inserting each of said core bars into a corresponding plurality of said pipes, said rotating means being operative for rotating each of said plurality of pipes and said feed means being operative for securely engaging the second end of each said core bar and for generating relative movement between said core bars and said pipes so that the plurality of pipes will be simultaneously processed.

3. A device according to claim 2, wherein said feed means comprises a holding and moving means for holding the second end of said core bar and moving said core bar through said pipe, said device further comprising a stationary pipe holding table for supporting the pipe being rotated by the rotating means.

4. A device according to claim 2, wherein said feed means comprises a stationary holding element for securely holding the second end of said core bar and a pipe moving and holding table which moves the rotating means and the pipe to be processed.

5. A device according to claim 2, wherein said feed means comprises a holding and moving element which moves in a first direction while holding the second end of said core bar and a pipe moving and holding table which moves the rotating means in a second direction opposite to said first direction while holding a pipe to be processed.

6. A device according to claim 1, wherein said feed means comprises a holding and moving means for holding the second end of said core bar and moving said core bar through said pipe, said device further comprising a stationary pipe holding table for supporting the pipe being rotated by the rotating means.

7. A device according to claim 1, wherein said feed means comprises a stationary holding element for securely holding the second end of said core bar and a pipe moving and holding table which moves the rotating means and the pipe to be processed.

8. A device according to claim 1, wherein said feed means comprises a holding and moving element which moves the rotating means in a first direction while holding the second end of said core bar and a pipe moving and holding table which moves in a second direction opposite to said first direction while holding a pipe to be processed.

9. A device as in claim 1, wherein the rotating means rotates the pipe at 3000 to 4000 rpm.

10. A device as in claim 1, wherein the feed means generates the relative movement between the core bar and the pipe after the rotating means starts rotating the pipe.

11. A device as in claim 10, wherein the feed means generates the relative movement between the core bar and the pipe at a speed of 100 to 300 mm/min.

* * * * *